(12) United States Patent
Froyland

(10) Patent No.: US 7,870,836 B2
(45) Date of Patent: Jan. 18, 2011

(54) DEVICE FOR RAISING, TRANSPORTATION AND RELEASING CRUSTACEA JUVENILES AND USE OF THE DEVICE

(76) Inventor: T. Kjetil Froyland, Astraveien 46, Stavanger (NO) N-4021

( * ) Notice: Subject to any disclaimer, the term of this patent is extended or adjusted under 35 U.S.C. 154(b) by 905 days.

(21) Appl. No.: 10/585,773

(22) PCT Filed: Jan. 10, 2005

(86) PCT No.: PCT/NO2005/000010

§ 371 (c)(1),
(2), (4) Date: Jul. 12, 2006

(87) PCT Pub. No.: WO2005/067707

PCT Pub. Date: Jul. 28, 2005

(65) Prior Publication Data

US 2008/0223304 A1    Sep. 18, 2008

(30) Foreign Application Priority Data

Jan. 13, 2004   (NO) .................................. 20040141

(51) Int. Cl.
*A01K 61/00* (2006.01)
*A01K 29/00* (2006.01)
(52) U.S. Cl. ......................... 119/209; 119/204
(58) Field of Classification Search ............... 119/204, 119/205, 206, 208, 209, 213, 221, 222, 234, 119/238
See application file for complete search history.

(56) References Cited

U.S. PATENT DOCUMENTS

| 3,316,881 A | * | 5/1967 | Fischer | 119/238 |
| 3,449,421 A | | 6/1969 | Pearson | |
| 3,741,159 A | * | 6/1973 | Halaunbrenner | 119/240 |
| 3,815,546 A | * | 6/1974 | Plante | 119/210 |
| 3,824,957 A | * | 7/1974 | Halaunbrenner | 119/238 |
| 3,870,019 A | * | 3/1975 | McNicol | 119/241 |
| 3,889,639 A | | 6/1975 | Day et al. | |
| 4,007,709 A | * | 2/1977 | Wishner | 119/210 |
| 4,036,176 A | | 7/1977 | McCarty et al. | |

(Continued)

FOREIGN PATENT DOCUMENTS

EP    0 285 457 A1    10/1988

(Continued)

OTHER PUBLICATIONS

International Search Report for parent application PCT/NO2005/000010, having a mailing date of May 10, 2005.

*Primary Examiner*—Timothy D Collins
*Assistant Examiner*—Monica Williams
(74) *Attorney, Agent, or Firm*—Andrus, Sceales, Starke & Sawall, LLP

(57) ABSTRACT

The present invention relates to a device for raising, transporting and releasing on a sea bed (50) crustacea juveniles which are in a housing section (1), the housing section (1) being adapted for connection to an emigration device (60, 80, 100) and the emigration device (60, 80, 100) being provided with at least one bore (70, 86) arranged to form an open path between an area near the surface of the sea bed (50) and a tubular element (10) disposed in a cut-out (12) in the housing section (1).

18 Claims, 12 Drawing Sheets

U.S. PATENT DOCUMENTS

| | | |
|---|---|---|
| 4,198,924 A | 4/1980 | Chapman |
| 4,279,218 A | 7/1981 | Brinkworth |
| 4,320,717 A * | 3/1982 | Rowley ...................... 119/241 |
| 4,337,727 A * | 7/1982 | Mickelsen et al. .......... 119/208 |
| 4,344,384 A | 8/1982 | Rowley |
| 4,559,902 A | 12/1985 | Mason et al. |
| 5,213,058 A * | 5/1993 | Parker et al. ................ 119/208 |
| 5,248,046 A * | 9/1993 | Rollason ..................... 209/675 |
| 5,515,813 A * | 5/1996 | Wilkerson ................... 119/223 |
| 6,089,191 A * | 7/2000 | Calinski et al. ............. 119/221 |
| 7,104,219 B2 * | 9/2006 | Frantz ........................ 119/221 |

FOREIGN PATENT DOCUMENTS

| | | |
|---|---|---|
| GB | 2 349 786 A | 11/2000 |
| NO | 0164271 B | 6/1990 |

* cited by examiner

DEVICE FOR RAISING, TRANSPORTATION AND RELEASING CRUSTACEA JUVENILES AND USE OF THE DEVICE

CROSS-REFERENCE TO RELATED APPLICATIONS

This application is the U.S. national stage application of International Application PCT/NO2005/000010, filed Jan. 10, 2005, which International Application was published on Jul. 28, 2005, as International Publication No. WO 2005/067707 A1 in the English language. The International Application claims priority of Norwegian Patent Application 20040141, filed Jan. 13, 2004.

BACKGROUND OF THE INVENTION

The present invention relates to a device and a method for holding, transporting and releasing crustacea juveniles, in particular lobster juveniles.

The object of the invention is to provide a device which enables the holding, transportation and release of crustacea juveniles, in particular lobster juveniles, in such a way that the juveniles are protected against predators until the juveniles have reached a stage, in which they have settled to the bottom and, on the bottom, instinctively leave the device which is formed by two main devices, which will be referred to below as the housing section and the emigration device.

Larvae that hatch from egg-bearing lobster with released eggs, live free-floating in the water until they have gone through three ecdyses and reached the fourth stage. Depending on the temperature of the water, this process varies from between two to six week. As the larvae are pelagic and even from birth are relatively big, they are, until in the fourth stage when they are about to settle to the bottom, a very easy prey for fish and other organisms hunting for food. Research results have proved that the survival rate until settling is about 0.5% for lobster juveniles born from egg-bearing lobster on the sea bed.

Because of this relatively low percentage of survival and because of the fact that, in their pelagic state, lobster juveniles can easily be carried away by sea currents from their hatching area, there is a wish to protect the lobster larvae against predators while in their pelagic stage and in the following stages until, after having been released onto oceanic feeding grounds, they instinctively leave the device, so that the survival percentage and recapture rate will increase considerably relative to what is achieved in normal release of lobster juveniles. Further, it is a wish that a relatively large number of lobster juveniles may be released in one single operation, in which the transport and the release operation itself can be carried out by preferably one person by means of relatively simple means, so that the operation becomes cost effective.

There are known a great number of devices for rearing and feeding lobster juveniles. From NO B 164271, U.S. Pat. No. 4,559,902, U.S. Pat. No. 4,198,924, U.S. Pat. No. 3,889,639 and U.S. Pat. No. 4,036,176 are known different facilities for rearing crustacea which are kept on discs or baskets in a vessel. Feed is supplied to the vessel or to the individual disc or basket by means of different types of feed supplying devices.

The prior art mentioned above presents several good solutions related to the rearing of, among other things, lobster which is in the pelagic stage, in which the lobster juveniles are protected against predators and lobster relatives. However, none of the above-mentioned documents shows or proposes any devices for transport and safe transfer of juveniles to free oceanic feeding grounds on the sea bed. Even though the juveniles are protected from hatching to release, the lobster juveniles are in a highly critical stage when being transferred from the rearing facility to the sea. It is common to carry out this release by releasing individuals into the sea from a boat. With this method relatively many individuals are eaten by predators before reaching the bottom of the sea. To reduce this critical stage, experiments have been done to carry the lobster juveniles from the boat to the sea bed by releasing the juveniles through a pipe or hose extending down to the bottom. This is, like the above-mentioned method, relatively time-consuming work and may entail that the juveniles are released at times which are not necessarily the best for the juveniles to stand a good chance of survival.

A further drawback of rearing juveniles individually, is that the juveniles are not trained for a life together with lobster relatives, which may result in loss of juveniles after the juveniles have been released on oceanic feeding grounds, because the juveniles have not developed any natural survival instincts.

From U.S. Pat. No. 3,449,421 and U.S. Pat. No. 4,279,218 are known devices which provide protection in the form of a cage for the individual lobster which remains in a rearing facility its entire lifetime.

Keeping lobster in a cage until it is ready for consumption is resource-demanding with respect to both technical devices and feeding and caring.

The invention has as its object to remedy, or at least reduce, one or more drawbacks of the prior art.

The object is realized through features which are specified in the description below and in the following Claims.

SUMMARY OF THE INVENTION

The present invention is formed by a rearing facility formed by at least one tray-like element which is placed, in a manner known in itself, in a vessel filled with water. The water in the vessel is circulated by means of pumping devices and is purified by means of filters. The at least one tray is advantageously provided with a substratum for the purpose of functioning as a safe house and protection against other juveniles, which is important as lobsters are cannibals. The lobster juveniles are transferred from a hatching tray and incubator, known in itself, to the rearing facility, preferably when the lobster juveniles are in the fourth stage.

The lobster juveniles are fed by means of a feeding device supplying the at least one tray with feed. To prevent lobster juveniles from leaving the tray-like element through the feed inlet opening in the periods between the feedings, the invention is arranged in such a way that the feed inlet opening is closed between the feedings.

The at least one tray is supplied with a number of lobster juveniles limited by the number of substrata on the tray, so that each individual will have a hiding place.

In order to ensure that the lobster juveniles do not leave the at least one tray, an element permeable to water is placed round the peripheral side surface of the tray in such a way that it forms a wall between the periphery of the tray and the vessel. Said water-permeable element preferably allows plankton to pass. When several trays are used, placed one above the other, the bottom surface of an overlying tray forms the ceiling surface of the corresponding underlying tray. On the topmost tray of the rearing facility a lid is placed in order to form an escape-proof room.

When the lobster juveniles are to be released onto oceanic feeding grounds, the housing section with the at least one tray is transferred to a transport container. Alternatively, the holding tray can be used as a transport container. In the invent of transport that lasts a long time, for example more than 12 hours, the water in the transport container can be circulated by means of a circulation device known in itself.

On arrival at the release area, the housing section is brought out of the transport container into an emigration device which is then lowered to the bottom of the sea at the desired place. Alternatively, the housing section is brought out of the transport container and lowered into an emigration device placed in advance on the sea bed.

In one embodiment the emigration device is formed by a support portion fixed to a bottom portion. The support portion has the effect of securing the housing section to the emigration device. The bottom portion is formed by a material of sufficient specific gravity to ensure stable positioning on the bottom, so that the emigration device will not move due to sea currents or lift from a float, to which ropes of the emigration device are attached. In order to form a path from the housing section to the sea bed outside the emigration device, at least one channel element is provided, forming a connection between the housing section and the bottom portion of the emigration device, in which cut-outs are formed, through which the lobster juveniles will pass on their way from the housing section to the oceanic feeding area. In order to prevent predators from entering the emigration device and at the same time prevent lobster juveniles, which have left the device, from going back in, the cut-outs are preferably provided with at least one one-way flap-like element which swings out from the emigration device. As an alternative to said flap-like element, the emigration device may be provided with a protective device at the exit, enabling the lobster juveniles to withdraw into the device again if they feel threatened. In a further alternative the at least one cut-out of the emigration device, through which the lobster passes from the housing section to the oceanic feeding area, is formed by a channel without any further devices for the protection of the juveniles as they leave the emigration device.

When the invention is used, the lobster juveniles will be in one and the same protected environment together with relative lobsters all the way from being introduced into the housing section, preferably in the fourth stage, until each individual, at the fifth to the seventh stage, leaves the housing section through the at least one channel element for a free life on the sea bed. Experiments have shown that the lobster juveniles instinctively emigrate from the device essentially during a period of from zero to seven days. This relatively long emigration period, together with emigration at the bottom of the sea, reduces the risk of being eaten by predators to a substantial degree as compared with the release of lobster juveniles according to the prior art. From experiments it has also been shown that the lobster juveniles choose to leave the device in special weather conditions.

BRIEF DESCRIPTION OF THE DRAWINGS

In what follows is described a non-limiting exemplary embodiment of a preferred embodiment which is visualized in the following drawings, in which.

DETAILED DESCRIPTION OF THE DRAWINGS

Figure 1:
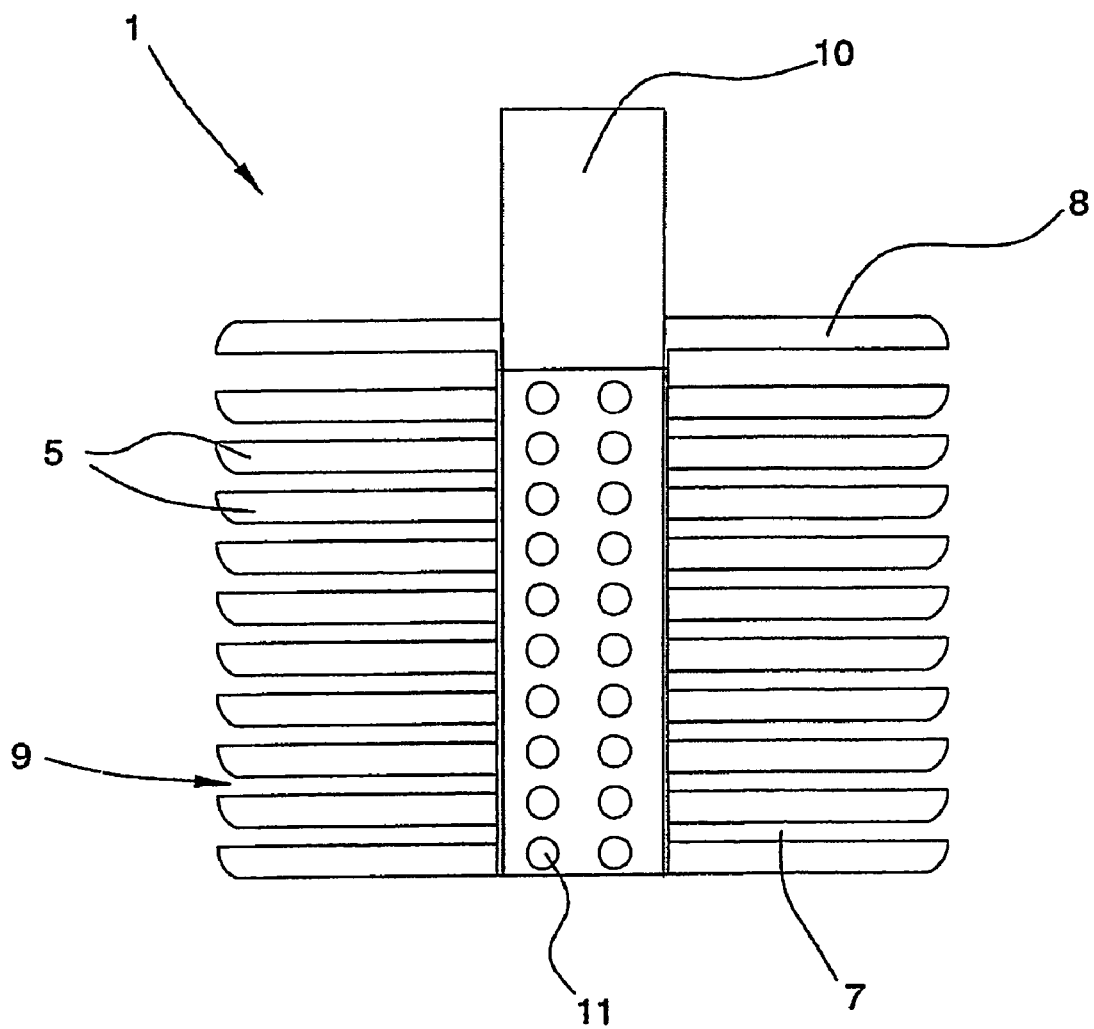
FIG. 1 shows a simplified view of a housing section formed by ten disc-shaped elements.

The terms of orientation, vertical and horizontal, refer to the position of use of the raising device in accordance with the drawings.

In the drawings the reference numeral 1 identifies a housing section formed by ten essentially disc-shaped elements 5 placed above each other round a vertical, central tubular element 10. The lobster juveniles (not shown) are placed in the housing section 1 in their fourth stage, for example, and are fed off until, at the fifth to the seventh stage, they are ready to be released onto oceanic feeding grounds. The release may be carried out by bringing the housing section 1 from a vessel, not shown, into a transport container 15, alternatively by said vessel being suitable for transport and being used as the transport container 15, which is transported to the site of release, where the housing section 1 is brought out of the transport container 15 down to the sea bed 50 or aboard a boat 51, alternatively by connecting it on shore to an emigration device 60. When the housing section 1 is connected to the emigration device 60 and is placed on the sea bed 50, the lobster juveniles instinctively leave the housing section 1 via the emigration device 60 for a free life on the sea bed 50.

In FIG. 1 a principle drawing, partly in a section, shows a housing section 1 which is formed by ten disc-shaped elements 5 disposed about a tubular element 10 which is provided with cut-outs 11 providing communication between the space 7 defined between two disc-shaped elements 5 and the interior of the tubular element 10. In order to define a space for the upper disc-shaped element 5', the housing section is provided with a top element 8.

In order to prevent the lobster juveniles from leaving or being carried out of the housing section 1 via peripheral openings 9 between two disc-shaped elements, a cloth or fine-meshed net 13 (FIG. 2) can be applied round the periphery of the housing section 1.

In the same way, a removable net-like element (not shown) is disposed round the internal surface of the tubular element 10, so that the lobster juveniles cannot leave the housing section 1 through the cut-outs 11 in the tubular element 10. Alternatively, the tubular element 10 can have such orientation that the cut-outs 11 are placed in a position which is non-corresponding with the at least one cut-out 41 of the disc-shaped element 5 (see FIG. 3).

Figure 2:
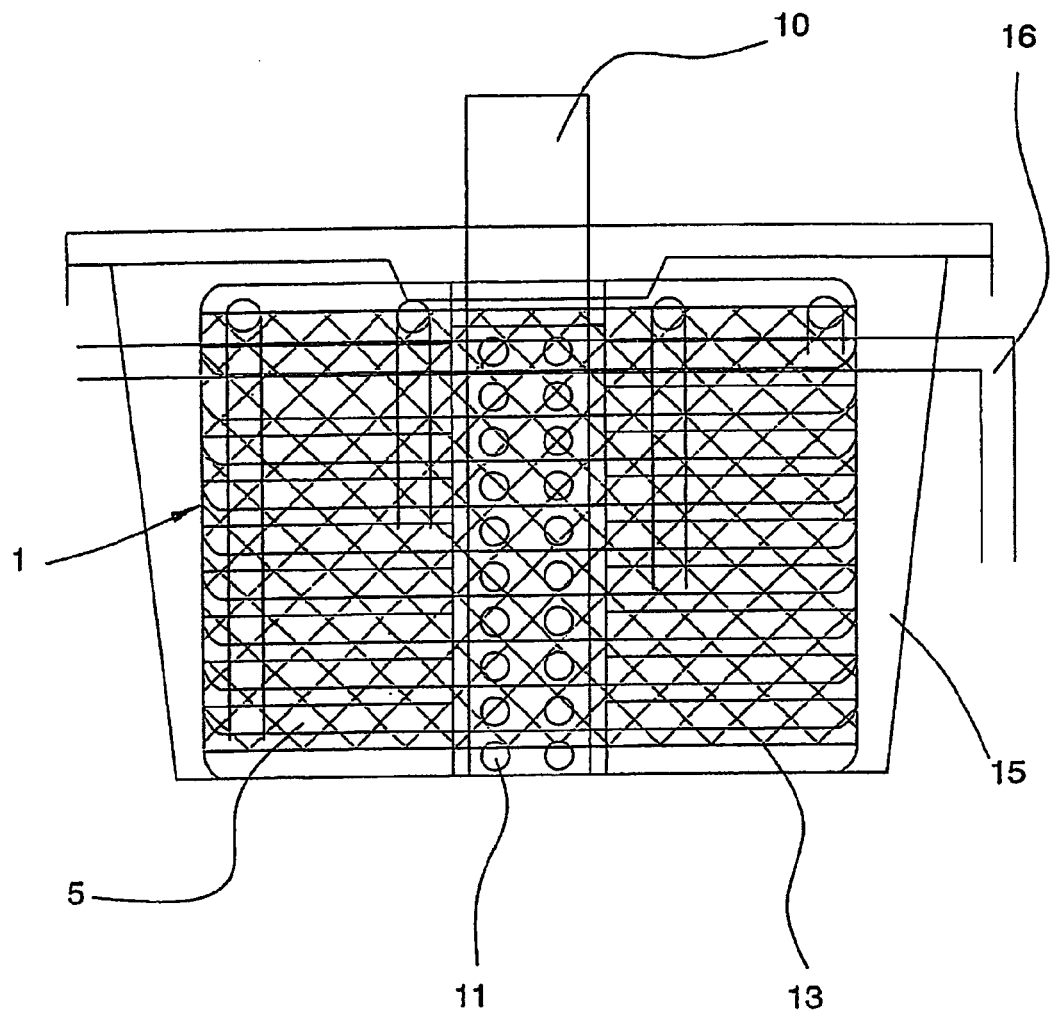
FIG. 2 shows a view of a rearing device in accordance with the invention, in which a housing section which is formed by ten essentially disc-shaped elements are placed vertically above each other, and in which the housing section is placed in a vessel.

In FIG. 2 the housing section 1 is shown placed in a container 15 provided with a pipe arrangement 16 for the circulation of water in the container 15.

Figure 3:
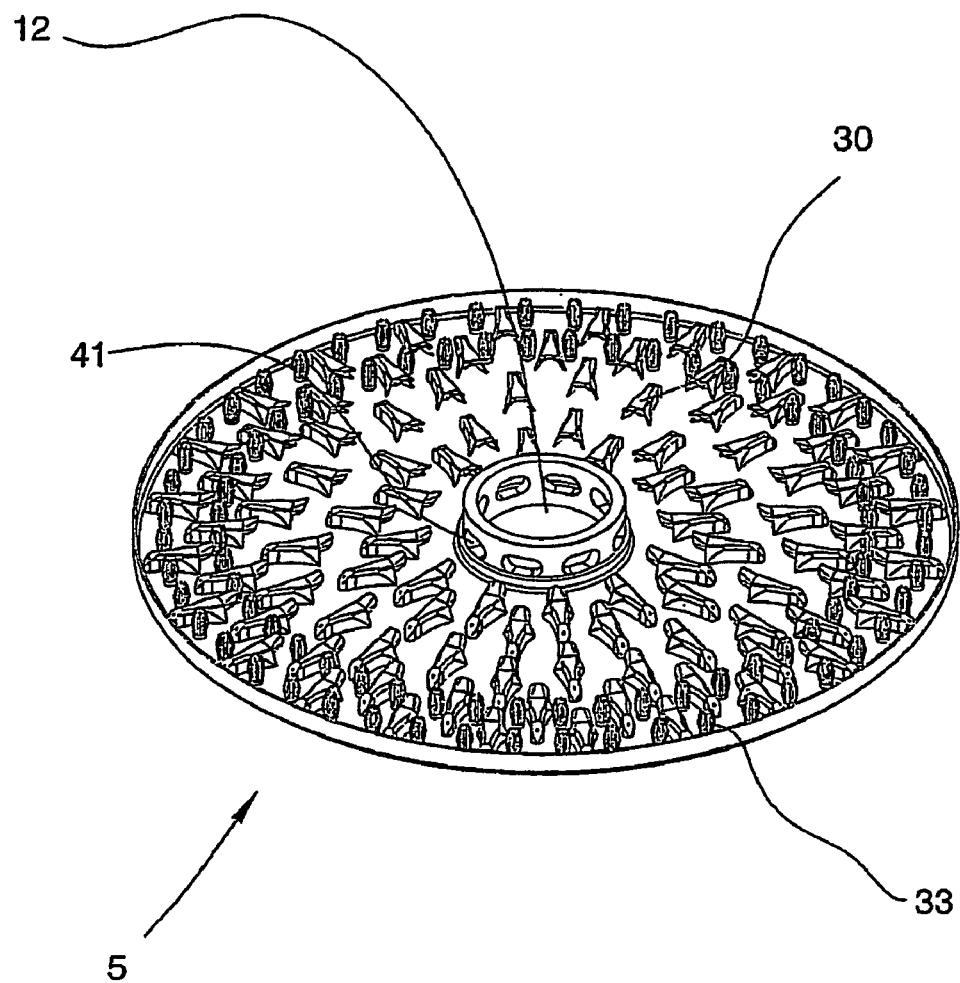
FIG. 3 shows a top view of one disc-shaped element of FIG. 1, in which there is placed a substratum with a number of "lobster caves" and artificial grass.

In FIG. 3 is shown a perspective view of an embodiment of a disc-shaped element 5 viewed at an angle from above. On the surface of the element are placed a number of elements defining cavities or caves 30 in which the lobster juveniles may seek shelter. In order to make the environment a natural one for the lobster juveniles, the surface of the disc-shaped element 5 is provided with portions of grass-like material 33. Round the centre of the disc-shaped element is shown a cut-out 12 which is adapted in such a manner that the tubular element 10 is complementary to the cut-out 12.

Figure 4:
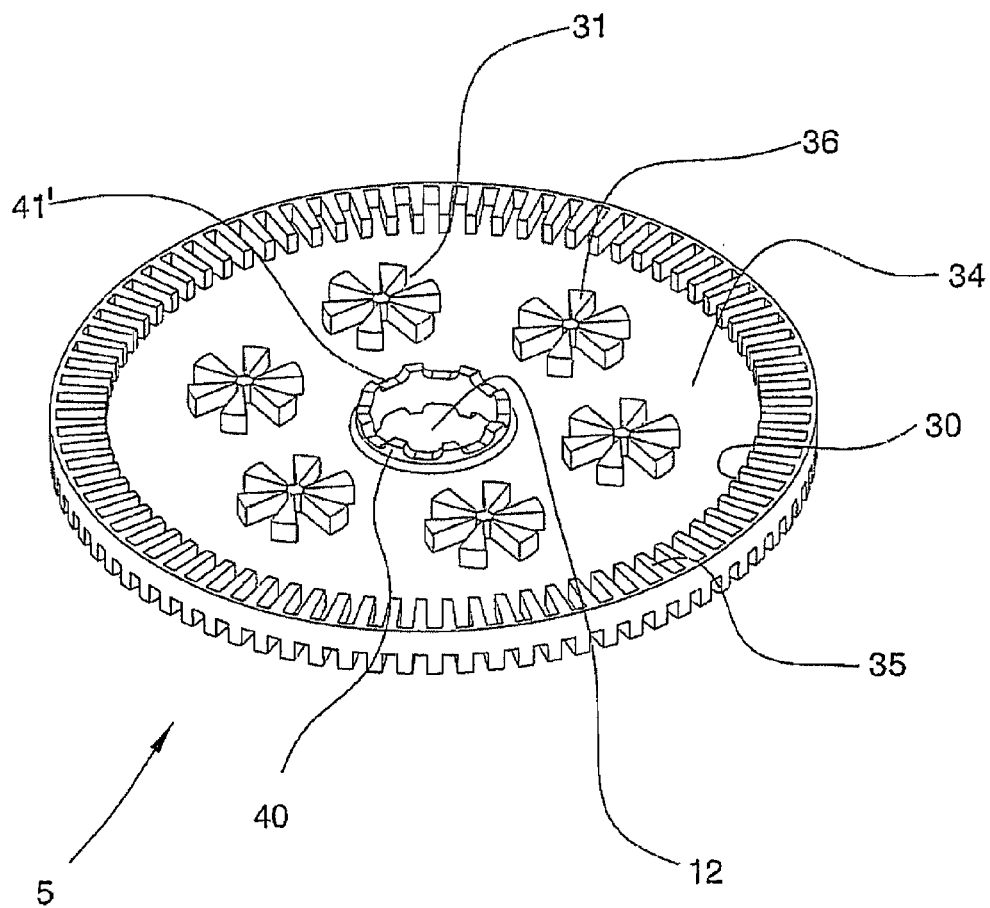
FIG. 4 shows in a perspective view an alternative embodiment of a disc-shaped element of FIG. 1, viewed at an angle from above, the "lobster caves" being placed at the periphery of the disc-shaped element and in six groups placed between the periphery and the central area of the disc-shaped element.
Figure 5:
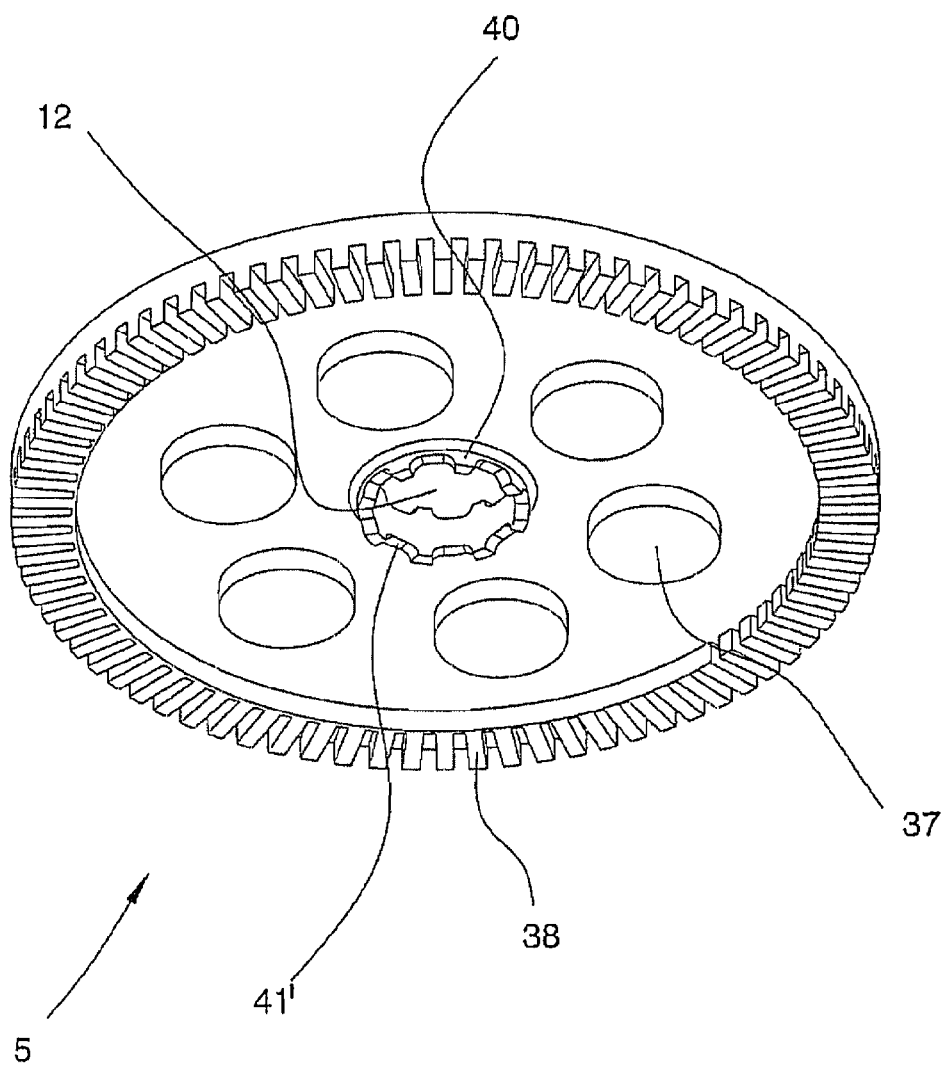
FIG. 5 shows the element of FIG. 4 viewed from below.

The FIGS. 4 and 5 show in perspective views, from above and below, respectively, an alternative embodiment of the disc-shaped element 5 shown in FIG. 3. In this alternative embodiment the disc-shaped element 5 is provided with a number of peripheral caves 30 defined by the bottom portion 34 of the element 5 and wall elements 35 extending inwards at essentially right angles from the periphery of the element 5 towards the centre of the element 5. In addition to the peripheral caves 30, a number of caves 31 are defined by a number of wall elements 36, resembling sectors of a circle, disposed on a surface portion between the periphery of the element 5 and the cut-out 12 at the centre portion of the element 5. The "ceilings" of the caves 31 are defined by corresponding disc elements 37 (FIG. 5) located on the underside of an overlying disc-shaped element 5. In a corresponding way the ceilings of the peripheral lobster caves 31 are defined by peripheral recesses 38 on the underside of a disc-shaped element 5 overlying in the position of use.

A person skilled in the art will understand that the lobster caves 30, 31 shown in the FIGS. 3-5 can be arranged in any number and in any orientation in the disc-shaped element 5.

The cut-out 12 at the centre portion of the element 5 shown in FIG. 4 is defined by an essentially circular castellated collar 40 formed by a cylinder element which is provided with recesses 41' at its end portions. When two disc-shaped elements are positioned above each other vertically, the recesses 41' form openings into the space defined by the cut-out 12.

Figure 6:
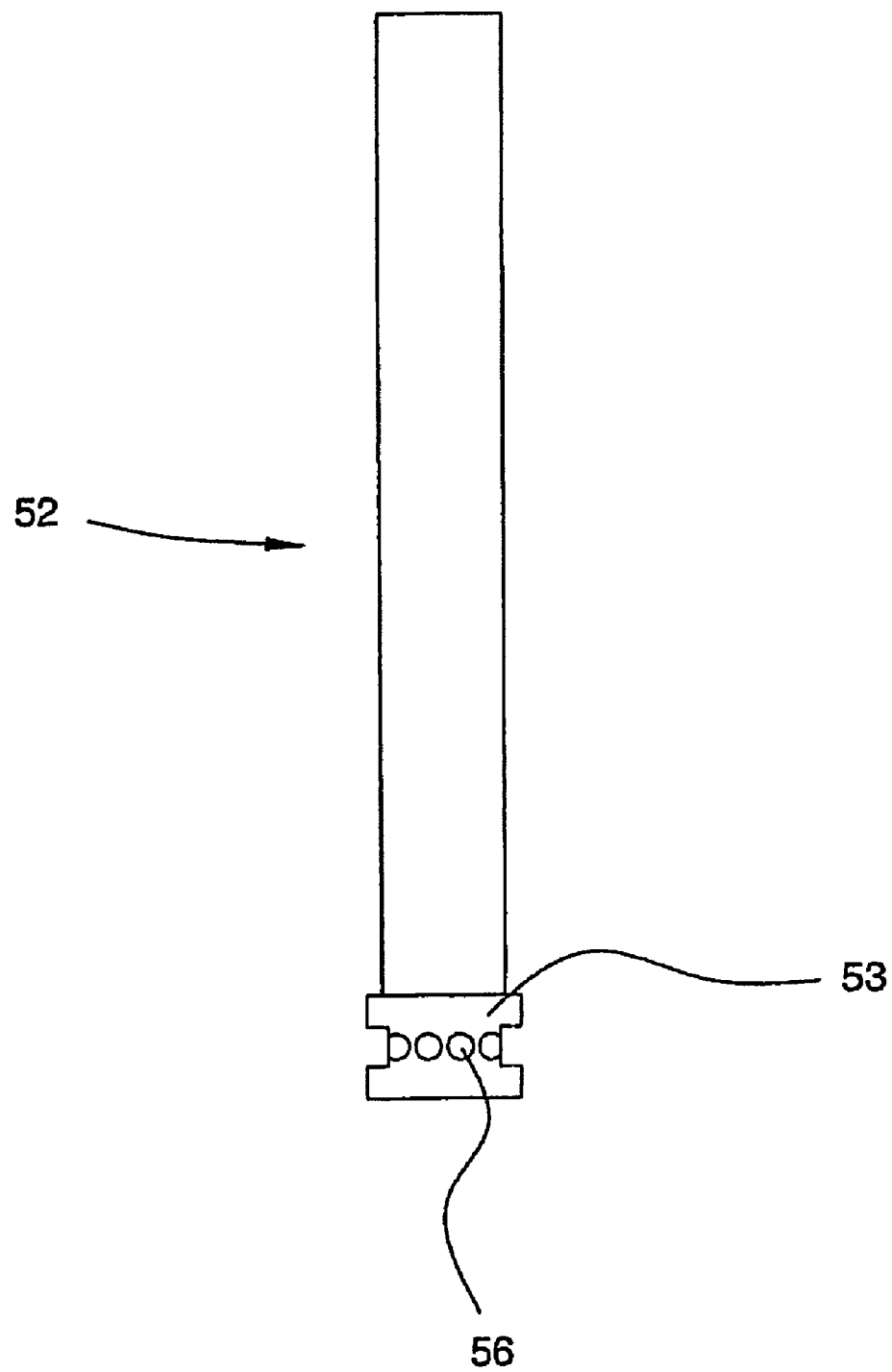
FIG. 6 shows a view of a feed pipe which is used when feed is being supplied to the individual disc-shaped element.

The supply of feed to the lobster juveniles in the housing section 1 effected by means of a feed pipe 52 (FIG. 6), which is provided at one end portion with a flange-like element 53, in which there are arranged a number of openings 56 through which food may be carried from the pipe in to the lobster juveniles via the cut-outs 11, 41, 41'. During feeding the feed pipe 52 is moved in such a way that the openings 56 come to coincide with the cut-outs 11, 41, 41', so that feed may pass in to the disc-shaped element 5. In this way the amount and possibly the type of feed which is carried onto the individual disc-shaped element 5, can be controlled.

When lobster juveniles are being released from the housing element 1 to feed freely on the sea bed 50, an emigration device is used.

Figure 7:
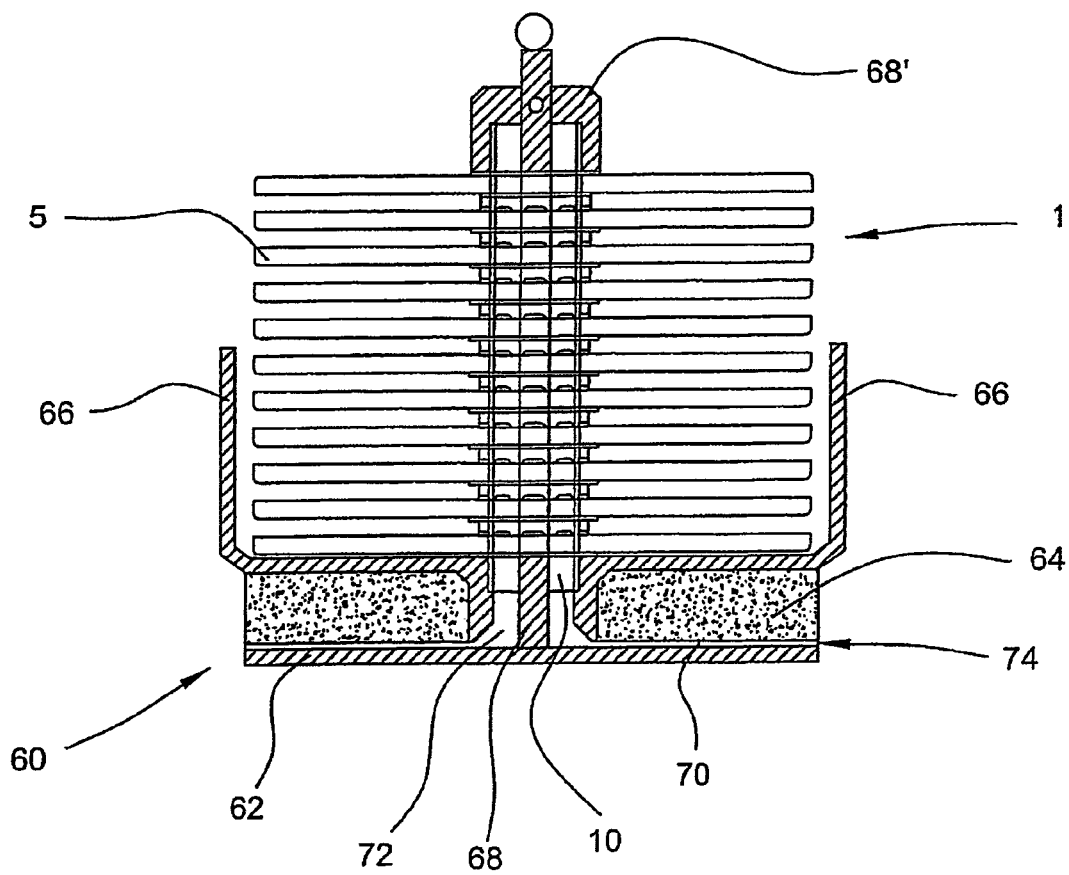
FIG. 7 shows a view of a housing section placed in an emigration device in accordance with the invention.

In FIG. 7 is shown an embodiment of an emigration device 60 in accordance with the invention, in which the emigration device 60 is formed by a bottom portion 62, a base 64, a side support element 66 and a mounting device 68.

Between the bottom portion 62 and the base portion 64 are arranged a number of channels 70 extending between a cut-out 72 at the centre portion of the base 64 and an outlet opening 74 at the periphery of the emigration device 60.

The mounting device 68 which is of a type known in itself, is fixed to the bottom portion 62 and extended up through the pipe 10 in the central cut-out 12 of the housing section 1. The upper portion of the mounting device 68 may, for example by means of a threaded connection, be screwed into firm abutment on the top element 8 of the housing section 1, so that the housing section 1 is prevented from relative movement relative to the emigration device 60.

When a possible net-like element (not shown) on the internal surface of the tubular element 10 has been removed, the lobster juveniles present in the housing section 1 of the device as shown in FIG. 7 may emigrate from the individual disc-like element 5, out through the recesses 41' of the castellated element 40, and then sink down to the bottom portion 62 of the emigration device 60 and move from there through a channel 70 out onto the sea bed 50.

Figure 8:
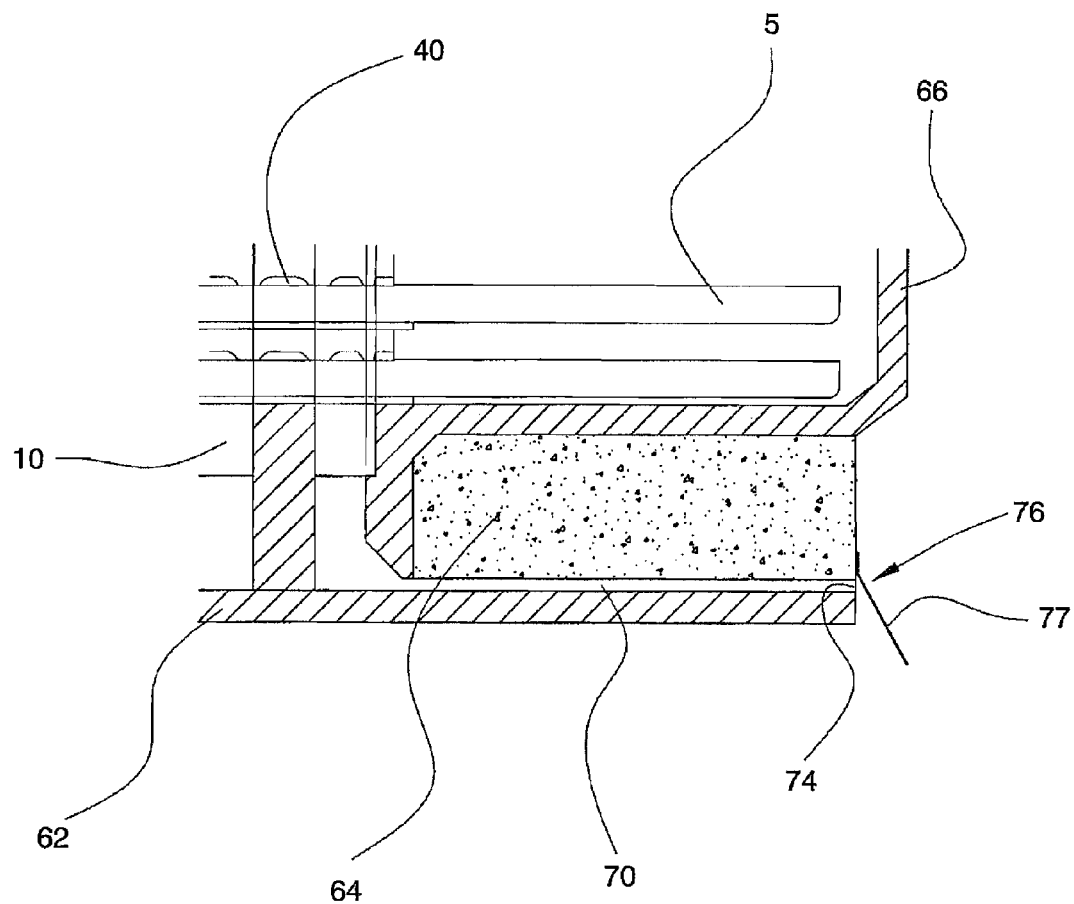
FIG. 8 shows an enlarged section of a lower right-hand portion of the emigration device of FIG. 7.
Figure 9:
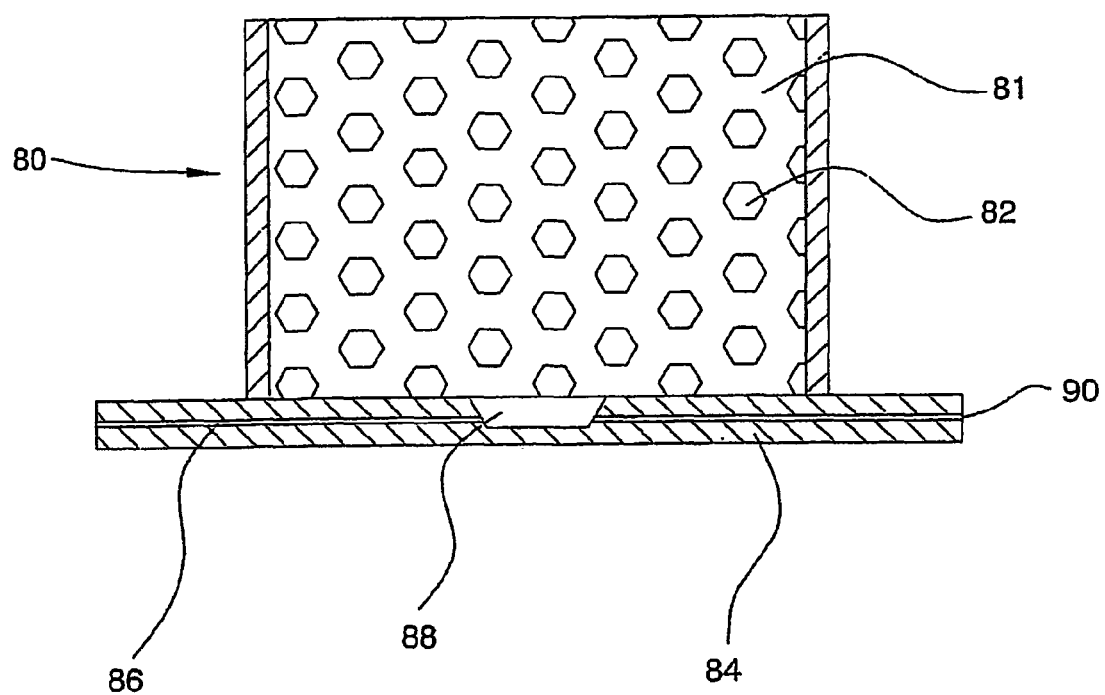
FIG. 9 shows a view of an alternative emigration device in accordance with the invention, in which the device is formed by a cylinder element provided with a plurality of through cut-outs in the side surface of the cylinder element.
Figure 10:
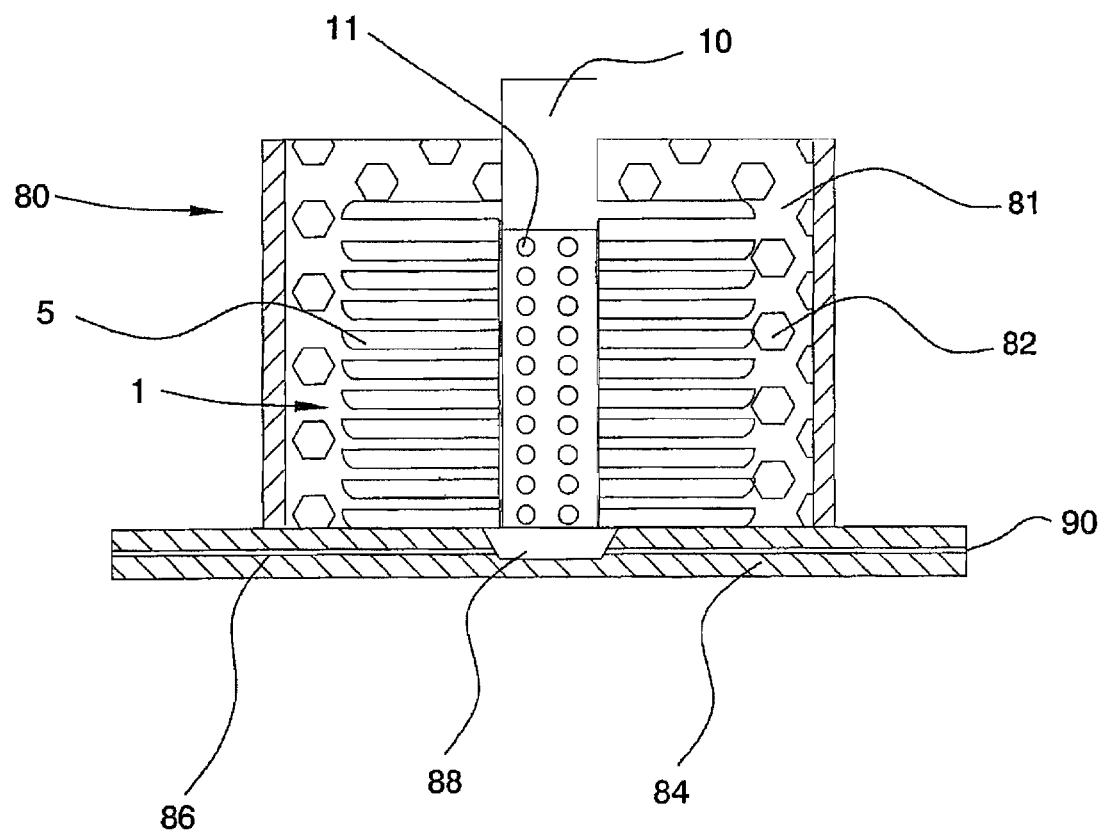
FIG. 10 shows a view of a housing section which is placed in an emigration device of FIG. 9.

FIGS. 9 and 10 show an alternative embodiment of the emigration device 60 which is shown in FIGS. 7 and 8, in which the emigration device 80 in accordance with the invention is formed by a cylinder element 81 of a preferably firm and rigid material, like concrete for example, the cylinder element 81 being provided with a plurality of cut-outs 82. The cylinder element 81 is fixed to a base 84 in which there are arranged a number of channels 86 connecting a recess 88 in the centre portion of the base 84 with an outlet 90 at the periphery of the base 84. In the same way as described for the emigration device 60, the lobster juveniles may wander from the housing section 1 via the recess 88 out through the cannel 86 onto the sea bed 50.

Alternatively to the base 84 shown in FIGS. 9 and 10, the base may be formed of a steel grid (not shown) known in itself.

Alternatively to the channel arrangement 86, the lobster juveniles may wander out through the cut-outs 82 in the lower part of the cylinder element 81 or openings or cut-outs (not shown) between the cylinder element 81 and base portion 84. In this alternative, the lobster juveniles must be given the chance to crawl out from the lower portion of the tubular element 10 into the annular space defined between the lower portion of the housing section 1 and the internal portion of the cylinder element 81, and/or to crawl out through openings 9 in the periphery of the disc-like element 5.

Figure 12:
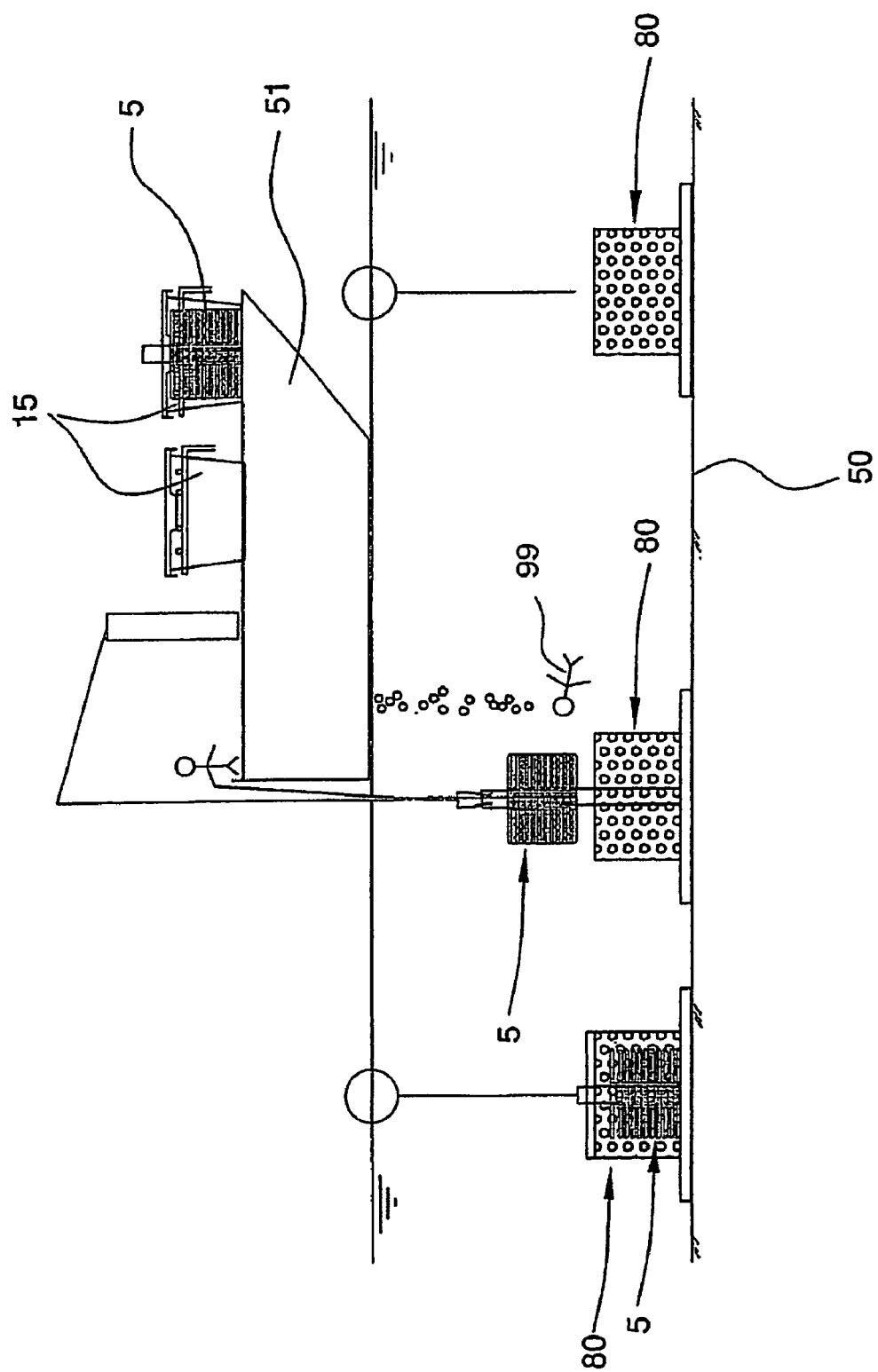
FIG. 12 shows a principle drawing of the method of placing housing sections into three emigration devices shown in FIG. 9.

The emigration device 80 shows a preferred embodiment, in which it is desirable to have an emigration device 80 essentially permanently placed on the sea bed 50 and/or in which it is desirable to have extra protection of the housing section 1 against external strains. In use, the housing section 1 is lowered into and attached to the emigration device 80 by a frogman 99 (FIG. 12), for example. Alternatively, the cut-out 12 of the housing section 1 is lowered down over a vertically extending guide element (not shown) which is essentially centralized and secured to the emigration device 80, preferably without being secured any further.

Figure 11:
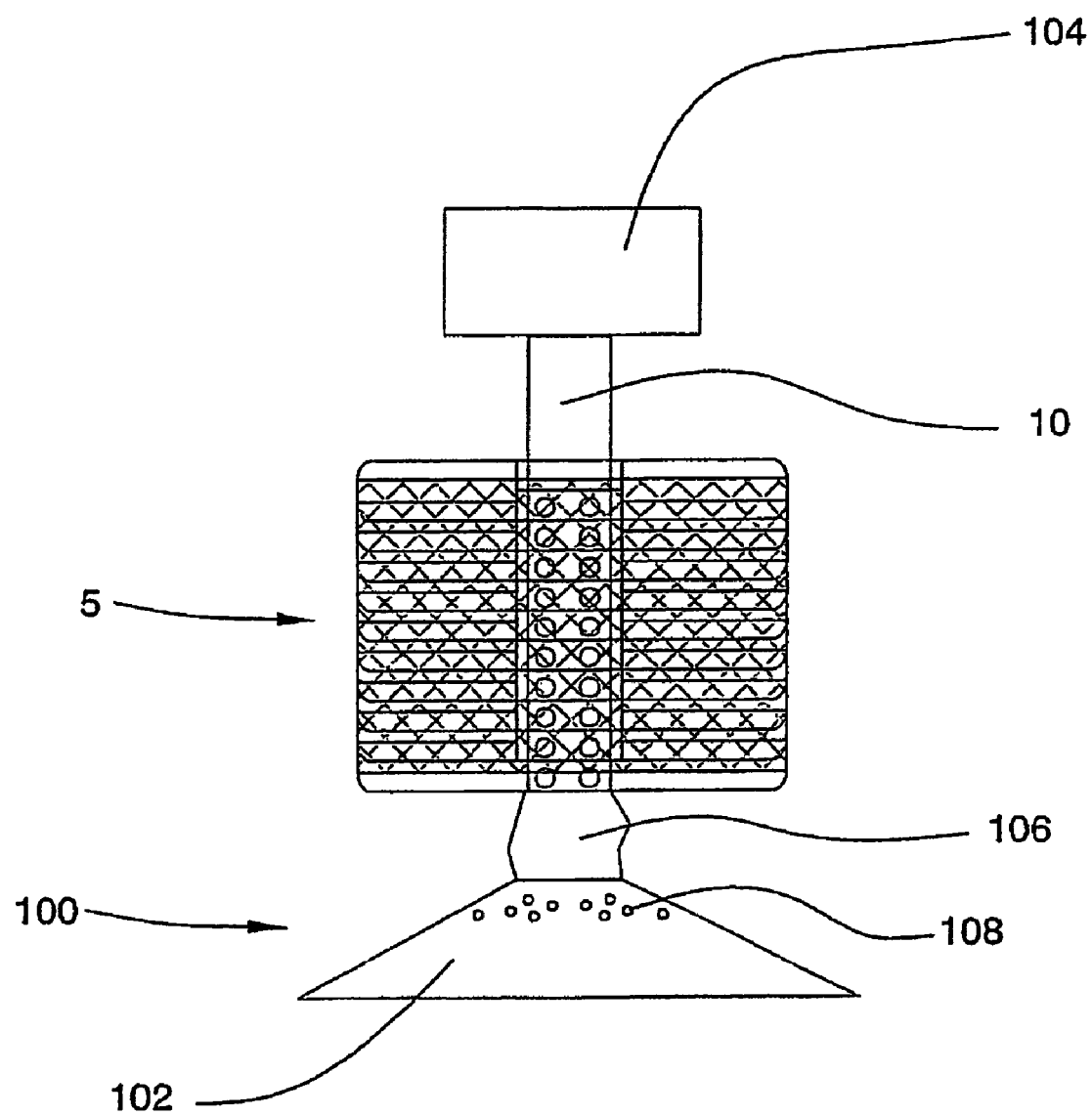
FIG. 11 shows a further alternative emigration device, in which the housing section is being placed between a base on the bottom of the sea and a buoyancy element.

FIG. 11 shows a further alternative embodiment of an emigration device 100 according to the present invention.

The emigration device 100 is formed by a base 102, and a buoyancy element 104 is attached to and placed at a distance above the base 102.

The housing section 1 is connected to the emigration device 100 between the base 102 and the buoyancy element 104, so that when the device is lowered into the sea, the base 102 and buoyancy element 104 will ensure correct orientation of the housing section 1. To ensure stability against external strains like sea currents, for example, the base 102 has a weight which very much exceeds the buoyancy provided by the buoyancy element 104.

In FIG. 11 the housing section 1 is placed at a distance from the base 102. As, for constructional reasons among other things, it is desirable to have an "articulating" connection is between the housing section 1 and the base 102, the pipe portion between the housing section 1 and the base 102 is formed by a flexible element 106. In in situ experiments a cylindrical rubber element has been used. A person skilled in the art will understand that any other flexible element may be used.

The flexible element 106 forms a channel which connects the tubular element 10 of the housing section 1 with the base.

The lobster juveniles move from the housing section to the emigration device 100 as described above in connection with the embodiment alternatives of FIGS. 7-10. From the housing section 1 the lobster juveniles sink down through the flexible element 106 to a recess (not shown) in the base 102. From said recess, channels (not shown) guide the lobster juveniles to outlet openings 108 in the base 102, through which the lobster juveniles crawl out onto the sea bed 50. The outlet opening 74, 108, 90 or the opening between the emigration device 80 and its base portion 84, may be provided with a one-way flap element 76 of a type known in itself, the flap element having the effect that predators, for example, cannot enter the emigration device 60, 80, 100. In a preferred embodiment, the flap element is formed by a plurality of flexible "fingers" 77 projecting, in the position of use, in a downward slope from a portion above the outlet opening. In order to accommodate irregularities on the sea bed 50, the flap element preferably extends further down than the lower end portion of the emigration device 60, 80, 100.

As earlier mentioned, experiments go to show that the emigration period essentially extends over zero to seven days after the housing section together with the emigration section has been placed on the sea bed. The device according to the invention has the effect that the lobster juveniles are protected from predators all the way from hatching until, at the bottom 50 of the sea, the lobster instinctively leaves the housing section 1 via the emigration device 60, 80, 100 for a free life in the oceanic feeding area.

The invention also deals with a method of releasing crustacea juveniles from the housing section 1, the method including:

Conveyance of a container 15 suitable for transport, containing the housing section 1 with crustacea juveniles, to a desired site for release;

removal of a net-like element (not shown) disposed at the internal surface of a tubular element 10, so that the crustacea juveniles can leave the housing section 1 through cut-outs 41, 41' in the housing section and cut-outs 11 in the tubular element 10;

fixation of the housing section 1 containing crustacea juveniles to an emigration device 60, 100;

lowering of the housing section 1 fixed to the emigration device 60, 100 to a desired point on the sea bed 50; and after a defined period of time, lifting the housing section 1 fixed to the emigration device 60, 100 to a boat 51 on the surface.

An alternative method for releasing crustacea juveniles from a housing section includes:

Conveyance of a container 15 suitable for transport, containing the housing section 1 with crustacea juveniles, to a desired site for release;

lowering of the housing section 1 into an emigration device 80 already placed on a sea bed 50;

placing the housing section 1 containing crustacea juveniles into an emigration device 80;

arranging for crustacea juveniles communication between the is housing section 1 and the emigration device 80; and after a defined period of time, separating the housing section 1 from the emigration device 80 and lifting the housing section 1 to a boat 51 on the surface.

The invention claimed is:

1. Apparatus for raising, transporting and releasing crustacea, the apparatus comprising:

an emigration device to be placed on a sea bed and a rearing device, the emigration device being arranged for engagement with the rearing device, and the emigration device being arranged to be placed between the sea bed and the rearing device, wherein the emigration device comprises at least one cut-out which arranges for crustacea to migrate from a portion of a second, essentially central cut-out in the rearing device onto the sea bed;

wherein the rearing device is formed by at least one tray, the tray being provided with an essentially centrally located cut-out, and the peripheral end portion of the tray being provided with a wall element which is arranged to prevent the passage of crustacea juveniles out of the external side portion of the rearing device, and the upper one of the tray being provided with a top element, and there being placed in a boundary portion between the tray and the cut-out a blocking element arranged to prevent undesired passing of crustacea juveniles between the tray and the central cut-out, wherein the blocking element is arranged to adopt, in a selective manner, a first position or a second position, the blocking element presenting, in the first position, a barrier against crustacea migration between the at least one tray and the cut-out, and presenting, in the second position, a passage for the migration of crustacea between said at least one tray and the cut-out.

2. An apparatus in accordance with claim 1, wherein the blocking element is formed by a perforated element arranged to allow feed to pass from the cut-out onto the at least one tray.

3. An apparatus in accordance with claim 1, wherein the blocking element is formed by a tubular element which is provided with cut-outs which are arranged to correspond selectively with at least one recess located in a separating element arranged to form a wall portion between the tray and the cut-out.

4. An apparatus in accordance with claim 1, wherein the at least one tray is arranged to receive a number of crustacea juveniles which can move freely on the entire surface of the at least one tray defined by the wall element and the blocking element.

5. An apparatus in accordance with claim 1, wherein the at least one tray is provided with a number of substrata which are arranged, at least in the position of use, to form at least one cavity into or out of which crustacea juveniles can move.

6. An apparatus in accordance with claim 5, wherein the number of substrata for forming cavities are essentially adapted for the number of crustacea juveniles to be raised on each one of the at least one tray, so that each crustacea juvenile preferably has a cavity to itself.

7. An apparatus in accordance with claim 1, wherein the wall element is formed by an element permeable to water.

8. An apparatus in accordance with claim 1, wherein the essentially central cut-out is arranged to receive a feeding device.

9. Apparatus for raising, transporting and releasing crustacea, the apparatus comprising:

a rearing device;

an emigration device engaging with the rearing device between a seabed and the rearing device; and an elongated conduit member extending through the rearing device to the emigration device, wherein a first cut-out is formed radially into the conduit member at a location that allows for migration of crustacea radially inwardly from the rearing device into the conduit;

wherein the emigration device defines a second cut-out at a location that allows for migration of crustacea from the conduit onto the seabed;

wherein the first cut-out and second cut-out are sized large enough to permit said migration of post-larval crustacea.

10. An apparatus in accordance with claim 9, wherein the elongated conduit member centrally extends through the rearing device.

11. An apparatus in accordance with claim 9, wherein the emigration device comprises at least one side support element being independent of the rearing device and projecting from a top portion of a base of the emigration device and extending essentially parallel to at least a portion of the elongated conduit member of the rearing device.

12. An apparatus in accordance with claim 11, wherein the at least one side support element is formed by a rod element.

13. An apparatus in accordance with claim 11, wherein the at least one side support element is formed by an element forming a wall of the rearing device.

14. An emigration device in accordance with claim 13, characterized in that the element forming a wall is provided with a plurality of perforations.

15. An apparatus in accordance with claim 11, wherein the emigration device comprises a mounting element fixed to the base for the securing of the rearing device to the emigration device.

16. An apparatus in accordance with claim 15, wherein the mounting element is arranged to extend up through a portion of the conduit member, and comprising a clamping device which is adjustably connected to the mounting body, being arranged to exert a force against a portion of the rearing device.

17. An emigration device in accordance with claim 9, characterized in that the emigration device is provided with a flexible element to provide a channel between the base and the cut-out of the rearing device, and that a buoyancy element which is connected to a portion of the rearing device, is positioned above the rearing device.

18. An apparatus in accordance with claim 9, wherein outlet openings of the emigration device are provided with a protective device providing protection for the crustacea juveniles as they leave the emigration device.

* * * * *